(12) United States Patent
Yeh

(10) Patent No.: US 7,421,320 B2
(45) Date of Patent: Sep. 2, 2008

(54) METHODS AND APPARATUS FOR IMPLEMENTING MID-VALUE SELECTION FUNCTIONS FOR DUAL DISSIMILAR PROCESSING MODULES

(75) Inventor: Ying C. Yeh, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 11/245,729

(22) Filed: Oct. 6, 2005

(65) Prior Publication Data

US 2007/0083301 A1    Apr. 12, 2007

(51) Int. Cl.
G01C 23/00    (2006.01)
(52) U.S. Cl. ......................................................... 701/3
(58) Field of Classification Search ........................ None
See application file for complete search history.

(56) References Cited

U.S. PATENT DOCUMENTS

| | | | |
|---|---|---|---|
| 4,471,481 A | 9/1984 | Shaw et al. | |
| 5,202,679 A * | 4/1993 | Tulpule et al. | ............... 340/2.7 |
| 5,493,497 A * | 2/1996 | Buus | ............................. 701/4 |
| 5,515,282 A | 5/1996 | Jackson | |
| 5,710,776 A | 1/1998 | Tomlinson et al. | |
| 5,802,077 A | 9/1998 | Yeh | |
| 6,813,527 B2 * | 11/2004 | Hess | ............................. 700/82 |
| 7,337,044 B2 * | 2/2008 | Platzer et al. | .................. 701/3 |

* cited by examiner

*Primary Examiner*—Michael J. Zanelli
(74) *Attorney, Agent, or Firm*—Felix L. Fischer

(57) ABSTRACT

A system providing mid-value selection (MVS) for control command output in a fly-by-wire system where the fly-by-wire systems includes a plurality of primary flight computers (PFCs) receiving data through integrated flight control buses from actuation control electronics (ACE) for flight crew and status sensor inputs, the PFCs providing data through the flight control buses to the ACE for control signal output, provides elements for receiving in an ACE data from each PFC and receiving a data valid signal with respect to each PFC. Fresh data for each PFC is selected as the data received or past MVS output responsive to the respective data valid signal. Based on a predetermined criterion the system chooses from the PFC fresh data a selected set of PFC fresh data as the MVS output and stores the MVS output for use.

16 Claims, 15 Drawing Sheets

FIG. 3

METHODS AND APPARATUS FOR IMPLEMENTING MID-VALUE SELECTION FUNCTIONS FOR DUAL DISSIMLAR PROCESSING MODULES

BACKGROUND OF THE INVENTION

1. Field of the Invention

This invention relates generally to the field of aircraft flight control systems and more particularly to a Mid-Value Selection function for incorporation in multichannel fly-by-wire system.

2. Description of the Related Art

Prior to the Boeing 777 aircraft Fly-By-Wire (FBW) systems, the most complicated flight controls computers in the prior art were triple channel autopilot computers for legacy Boeing airplanes (Boeing 747, 757, 767). On these flight controls systems, mechanical/hydraulic actuators serve as the mid-value selector for the control of airplane primary control surfaces, with electrical input commands from triple autopilot computers. The mechanical/hydraulic mid-value selector is less reliable and maintainable, and is more costly compared to electronics flight controls, such as those employed on the Airbus 320 and Boeing 777 FBW airplanes.

As disclosed in U.S. Pat. No. 5,802,077 entitled Methods and Apparatus for Obtaining High Integrity and Availability in a Multi- Channel System, issued Sep. 1, 1998 to Ying C. Yeh and U.S. Pat. No. 5,515,282 entitled Methods and Apparatus for Implementing a Databus Voter to Select Flight Command Signals from One of Several Redundant Asynchronous Digitial Primary Flight Computers issued May 7, 1996 to Douglas O. Jackson, both patents having a common assignee with the present application and incorporated herein by reference as though fully set forth, the conclusion reached for systems for the Boeing 777 Fly-By-Wire Architecture was to design an asynchronous multi-channel (a minimum of three channels with a minimum of three computation lanes in each channel) system as the host to serve as the guardian of the common communication media. The three computation lanes in each channel employed dissimilar processors and compilers so that the computer architecture is fail-operational to generic errors.

It is desirable for a new architecture to provide a lower cost solution for FBW computer architecture based on prior art FBW experience. It is also desirable that the prior art Primary Flight Computer (PFC) mid-value selection function be replaced by a mid-value selection function integrated in each digital/analog conversion channel generally referred to herein as Actuation Control Electronics (ACE). On exemplary prior art FBW systems, the PFC can command 50% of primary surface and therefore the mid-value selection function as identified in U.S. Pat. No. 5,515,282 is designed with a functional integrity of 1.0E-10 per hour. It is possible for new FBW systems, with mid-value selection in the ACE and with each ACE controlling 25% of primary surface, that the mid-value select function can be designed with a lesser integrity requirement than that of the prior art PFC equivalent function.

SUMMARY OF THE INVENTION

A system incorporating the present invention provides mid-value selection (MVS) for control command output in a fly-by-wire system. The fly-by-wire systems includes a plurality of primary flight computers (PFCs) receiving data through integrated flight control buses from actuation control electronics (ACE) for flight crew and status sensor inputs, the PFCs providing data through the flight control buses to the ACE for control signal output. The invention provides elements for receiving in an ACE data from each PFC and receiving a data valid signal with respect to each PFC. Fresh data for each PFC is selected as the data received or past MVS output responsive to the respective data valid signal. Based on a predetermined criterion the system chooses from the PFC fresh data a selected set of PFC fresh data as the MVS output and stores the MVS output for use.

BRIEF DESCRIPTION OF THE DRAWINGS

These and other features and advantages of the present invention will be better understood by reference to the following detailed description when considered in connection with the accompanying drawings wherein:

FIG. 3 is a block diagram of and exemplary ACE implementation for the system of FIG. 2;

FIG. 4e is a block diagram of the discrete data implementation of the mid-value selection of FIG. 4a;

FIG. 5a is a block diagram of the MVS monitor of FIG. 4a;

DETAILED DESCRIPTION OF THE INVENTION

Figure 1:
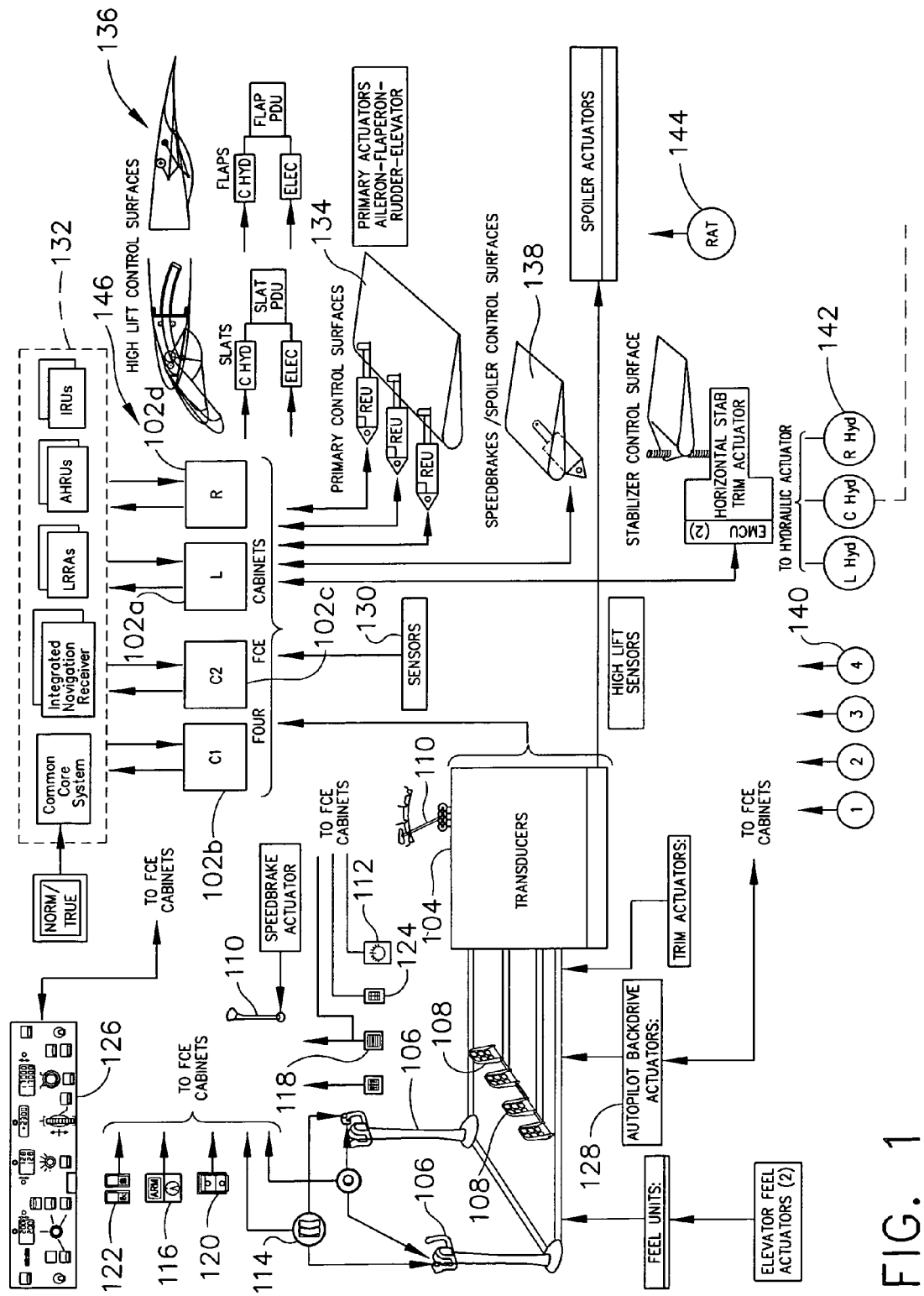
FIG. 1 is a block diagram of an exemplary FBW system in which the present invention is implemented.

The present invention is embodied in an exemplary implementation having an asynchronous multi-channel system with a minimum of three channels for digital computation and four channels for digital/analog conversion. Each digital computation channel contains two computation lanes with dissimilar processors and compilers, Hence with dual dissimilar processors, the digital computation architecture is fail-passive to generic errors. A set of algorithms for a Mid-value Selection (MVS) function is implemented in software or hardware installed in each digital/analog conversion channel referred to herein as Actuation Control Electronics (ACE). An overview of an exemplary FBW system in which the present invention is implemented is shown in FIG. 1 in which four flight control electronics (FCE) cabinets 102a, 102b, 102c and 102d are the symbolic representation of exemplary FBW computers, with implementation to be described subsequently herein.

The FCE receive signal inputs from transducers, generally designated 104, responding to inputs from control yokes 106 and rudder pedals 108 to provide column position and column force, wheel position and force, rudder pedal position and force. Additional standard controls such as speed brake and flap levers 110 also provide transducer inputs. Rudder trim 112 and pitch trim 114 as well as alternate flap switch 116, alternate pitch trim switch 118, PFC disconnect 120, Takeoff/Go around (TO/GA) switch 122, rudder trim MTC switch 124, and the functions of the mode control panel 126 provide input to the FCEs indicating control status inputs by the pilots. Aircraft systems such as the autopilot backdrive actuators 128 also provide input to the FCEs. Sensors 130 provide pitch, roll and yaw rate information to the FCEs in addition to stabilator position, modal suppression and gust suppression information. Static and total air pressure and angle of attack are typical additional sensor inputs.

The FCEs also receive data and provide data to the supporting systems 132 such as integrated navigation receivers, Low Range Radio Altimeters (LRRAs), Attitude and Heading Reference Units (AHRUs) and Inertial Reference Units (IRUs) as well as the common core system. The FCEs also communicate with the primary flight control surface actuators 134 for aileron, flaperon, elevator and rudder surfaces, the high lift control surfaces 136 such as leading edge slats and trailing edge flaps, and speed brake/spoiler control surfaces 138.

Electrical power for the system is provided through four permanent magnet generators (PMGs) 140 while hydraulic power is provided through left, center and right hydraulic systems 142 assisted for emergencies by a ram air turbine (RAT) 144.

Figure 2:
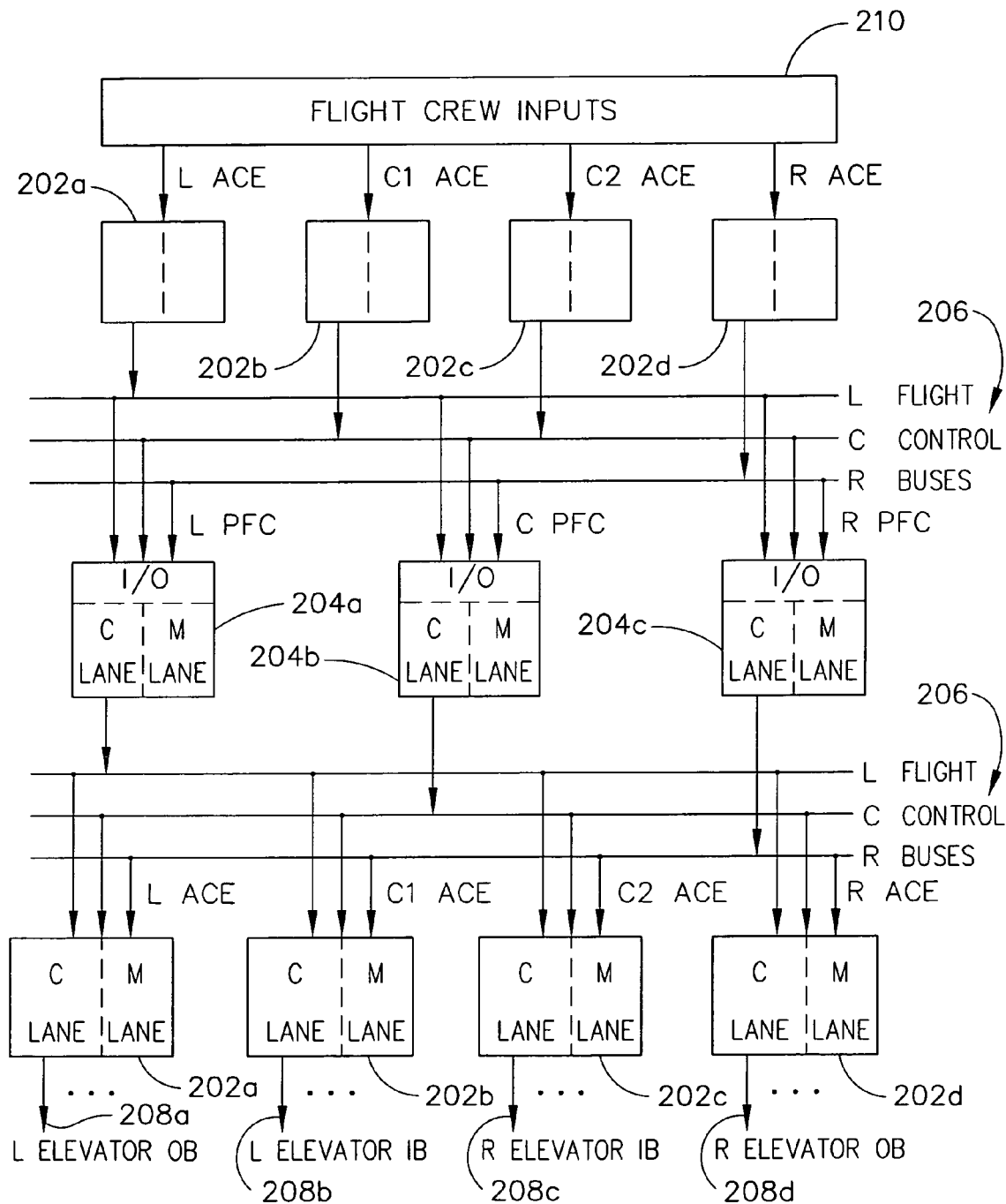
FIG. 2 is a block diagram of an exemplary flight controls electronic architecture for an embodiment employing the present invention.

A general design block diagram for ACE implementation is shown in FIG. 2. Two major types of Line Replaceable Modules (LRMs) are employed; PFC (primary flight computer) and ACE (actuation control electronics). One ACE in each FCE cabinet, and one PFC in three of four FCE cabinets are present in the embodiment disclosed in the drawings. For the embodiment disclosed in the drawings, the four ACE are designated Left (L ACE) 202*a*, Center 1 (C1 ACE) 202*b*, Center 2 (C2 ACE) 202*c* and Right (R ACE) 202*d*. The PFCs are similarly designated Left (L PFC) 204*a*, Center (C PFC) 204*b* and Right (R PFC) 204*c*. For clarity in FIG. 2, the ACEs input and output functions are depicted with separate boxes commonly numbered. Similarly, the flight controls data buses 206 which interconnect the ACEs and PFCs are shown separately for input streams and output streams for the ACEs. Comparing the embodiment disclosed herein with the 5,515,282 patent as exemplary prior art, the triple channel PFC data are received synchronously by an ACE channel, instead of asynchronously by the PFC and the data set from each PFC is received in totality before voting, instead of voting on-the-fly (word by word voting) by PFC. Thus the simplicity of a system employing the present invention facilitates lower cost MVS implementation in non-recurring design and certification cost.

Pilot commands are input through conventional controls shown in FIG. 1 are generally designated as flight crew inputs 210. The PFCs receive airplane inertial and air data from the support systems. Multiple position transducers mounted on each pilot controller sense the pilot commands for the ACEs. The ACEs convert the analog command signals into digital form and transmit them to the PFCs via redundant flight controls data buses 206. The PFCs use this data with the pilot inputs to calculate control surface position commands. Surface commands are then transmitted via the flight controls data buses to the ACEs which provide outputs 208*a* to 208*d* to the control surface actuating units. For the embodiment shown, the inboard and outboard elevator actuators for each of the elements of the elevator pair are used as examples.

The following PFC and ACE functions are described generally with respect to the disclosed embodiment for the present invention.

1. Frame Synchronization

Each pair of dissimilar lanes in the PFC and ACE is frame synchronized. However all PFC and ACE channels are asynchronous.

2. Flight Control Data Bus

The flight control data bus is implemented as a global data bus, such as ARINC 629 data bus as defined in U.S. Pat. No. 4,471,481 entitled Autonomous Terminal Data Communication System issued Sep. 11, 1984, to John L. Shaw & Hans K. Herzog, or it alternatively as a point-to-point data bus, between PFCs, and between PFCs and ACEs. A cyclic redundancy check (CRC) is provided to detect communication media error as defined in U.S. Pat. No. 5,515,282

3. Input Signal Management (ISM)

The ISM function as defined in U.S. Pat. No. 5,710,776 entitled Signal Selection and Fault Detection Apparatus and Method issued Jan. 20, 1998 to Lloyd R Tomlinson & Robert E. Freeman is applied to the exemplary PFC.

4. Self-Monitoring Pair

The self-monitoring pair concept is widely used in many Aerospace computer architectures, with a command lane and a monitor lane. The monitor lane monitors the command lane's output and provides error message or shuts down the channel.

5. Mid-Value Selection

The prior art PFC mid-value selection function as described in U.S. Pat. No. 5,515,282 is replaced by a mid-value selection function in each ACE, as will be described with respect to FIG. 3.

6. PFC Channel Redman Function

The PFC channels are designed to be convergent for startup/restart condition. If a PFC channel cannot converge for a specified long period of time, this PFC channel can be inhibited by other two PFCs, using the algorithm of U.S. Pat. No. 5,802,077. This PFC function is employed to supplement the ACE mid-value selection function in an embodiment such as that disclosed for the overall redundancy management of the fly-by-wire computer architecture.

7. Related Flight Controls Functions

Each Engine provides two permanent magnet generator (PMG) outputs for a total of four PMGs per airplane. Each PMG power output is conditioned by a power supply assembly (PSA), located in each FCE, that provides regulated power to the FCE. A flight control dedicated Battery is connected to each FCE to ensure non-interruptible power sources to FCE.

The FBW computer architecture of the disclosed embodiment consists of triple-dual PFC channels (for extremely high functional availability in addition to extremely high functional integrity) and Quad-dual ACE channels as shown in FIG. 2. The key attribute in configuring four ACEs in this embodiment is to provide a one-to-one match with Elevator Actuators. The airplane is designed with two elevator actuators on each of the Left and Right Elevator surfaces. In alternative embodiments where the airplane is designed with three Elevator actuators per surface, the architecture is configured with three ACEs. The flight controls data buses are used for all communication between PFCs, and between each PFC and all ACEs. Separate data buses 146 are used between PFCs and other electronics LRUs as shown in FIG. 1. The triple PFCs are not synchronous and are installed in three separate physical locations in three of the four FCEs to prevent common mode/area fault from affecting more than one PFC channel. The Quad ACEs are installed in four separate physical locations, i.e., the four FCE cabinets.

Figure 3:
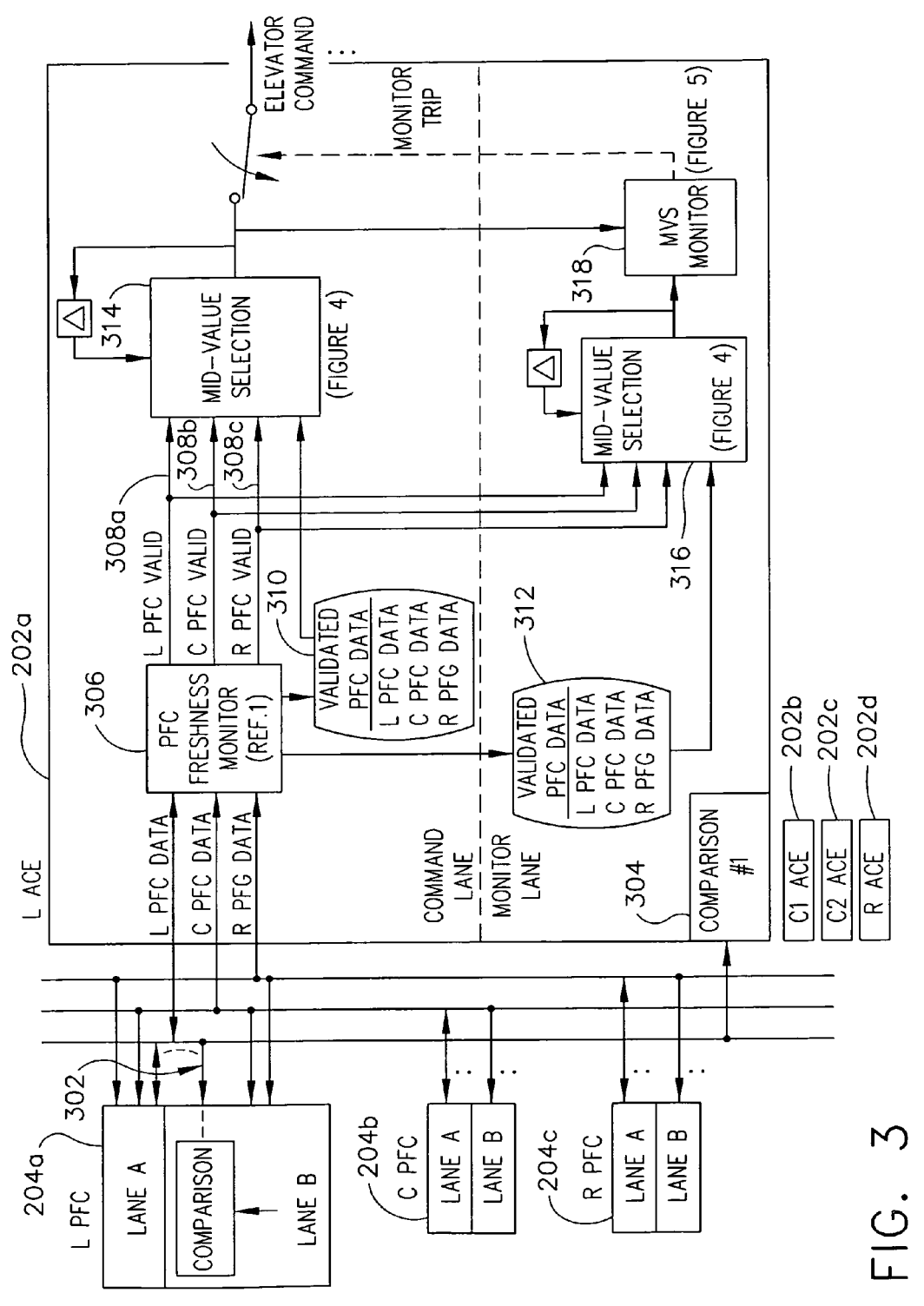

Referring to FIG. 3, each PFC channel 204*a*, 204*b* or 204*c*, consists of a pair of dissimilar lanes, Lane A and Lane B. The two lanes are frame synchronized so that both lanes start their scheduled processing, in each minor frame (for example 10 ms or 12.5 ms, etc) within a reasonable tolerance (such as 10 microseconds) of each other. Lane A is designed as the Command Lane, and Lane B as the Monitor Lane. The PFC computes airplane surface commands (Elevator, Aileron, Rudder, Flaperon, Spoiler, etc.) for transmission to ACE. The Command lane sends the outputs to the ACEs, and Monitor lane also receives command lane output and apply inhibit to the Command lane for persistent erroneous Command lane outputs. Cross channel equalization of critical variables and cross channel consolidation of system states are provided for consistent system states and for convergence of critical variables. For the disclosed embodiment, the consolidation of system state is via majority decision among the three PFC channels. The PFCs receive feedback through the bus as represented by element 302. Two healthy PFC channels apply an inhibit to a third PFC channel for persistent incapability to converge on system states using an algorithm such as that disclosed in U.S. Pat. No. 5,802,077. All critical data sent by each PFC is ended and protected with a CRC check word, sent as the last word of each wordstring as defined in U.S. Pat. No. 5,710,776 as previously referenced. The data within a wordstring can be accepted by the receiving PFCs or ACEs only if the wordstring passes the CRC check.

Similarly, each ACE has a command lane and monitor lane. Using L ACE 202a as an example shown in FIG. 3, the ACE's Command Lane A sends critical input signals (column/wheel LVDT's inputs, etc.) to each PFC, while the ACE's Monitor Lane B receives its Command data via a data bus wrap back to compare with its own version for cross lane monitoring in COMPARISION 1 304. The critical ACE data wordstring, similar to PFC transmission, is ended with a CRC check word. The ACE's Monitor Lane B applies cross-lane shutdown of the Command Lane, if it disagrees with Command Lane A for a short period of time. Each PFC Command Lane sends actuator surface command data to each ACE Command Lane. The received PFC commands will be processed in a Freshness Monitor 306 such as that defined in FIG. 13 of U.S. Pat. No. 5,802,077. The ACE will generate "L/C/R PFC Valid" discrete outputs 308a, 308b and 308c for fresh PFC data "Validated PFC data" 310 is provided in the Command Lane and "Validated PFC data" 312 is provided in the Monitor Lane. Similarly, a mid-value select (MVS) function 314 is provided in the Command Lane and a MVS function 316 is provided in the Monitor Lane operating on validated L/C/R PFC data. The Monitor Lane also provides a "MVS monitor" function 318, as will be described in greater detail with respect to FIG. 5, to compare MVS operation of the two lanes. The Monitor Lane will apply an inhibit to the Command Lane for persistent disagreement of their MVS output.

Figure 4A:
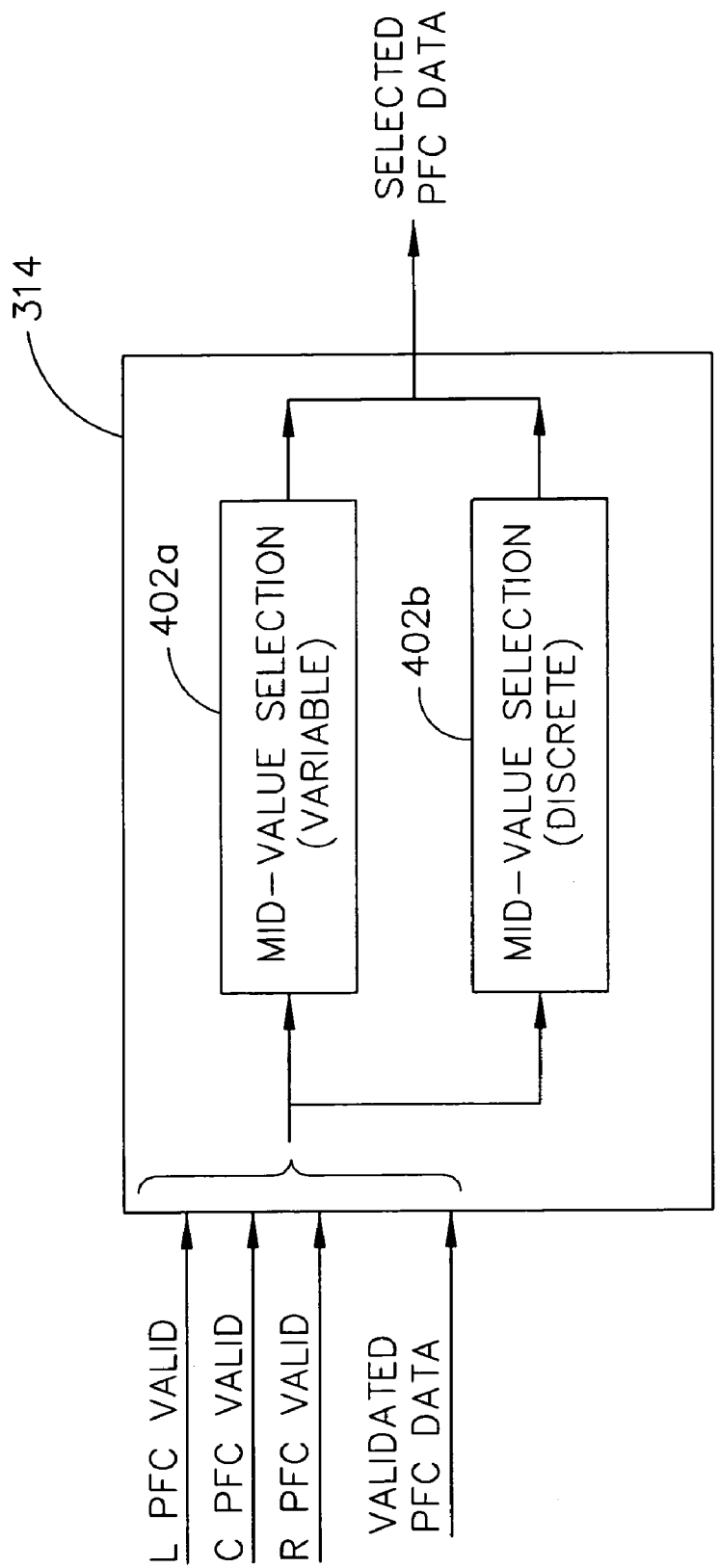
FIG. 4a is a block diagram of the mid-value selection element as applied in FIG. 3.
Figure 4B:
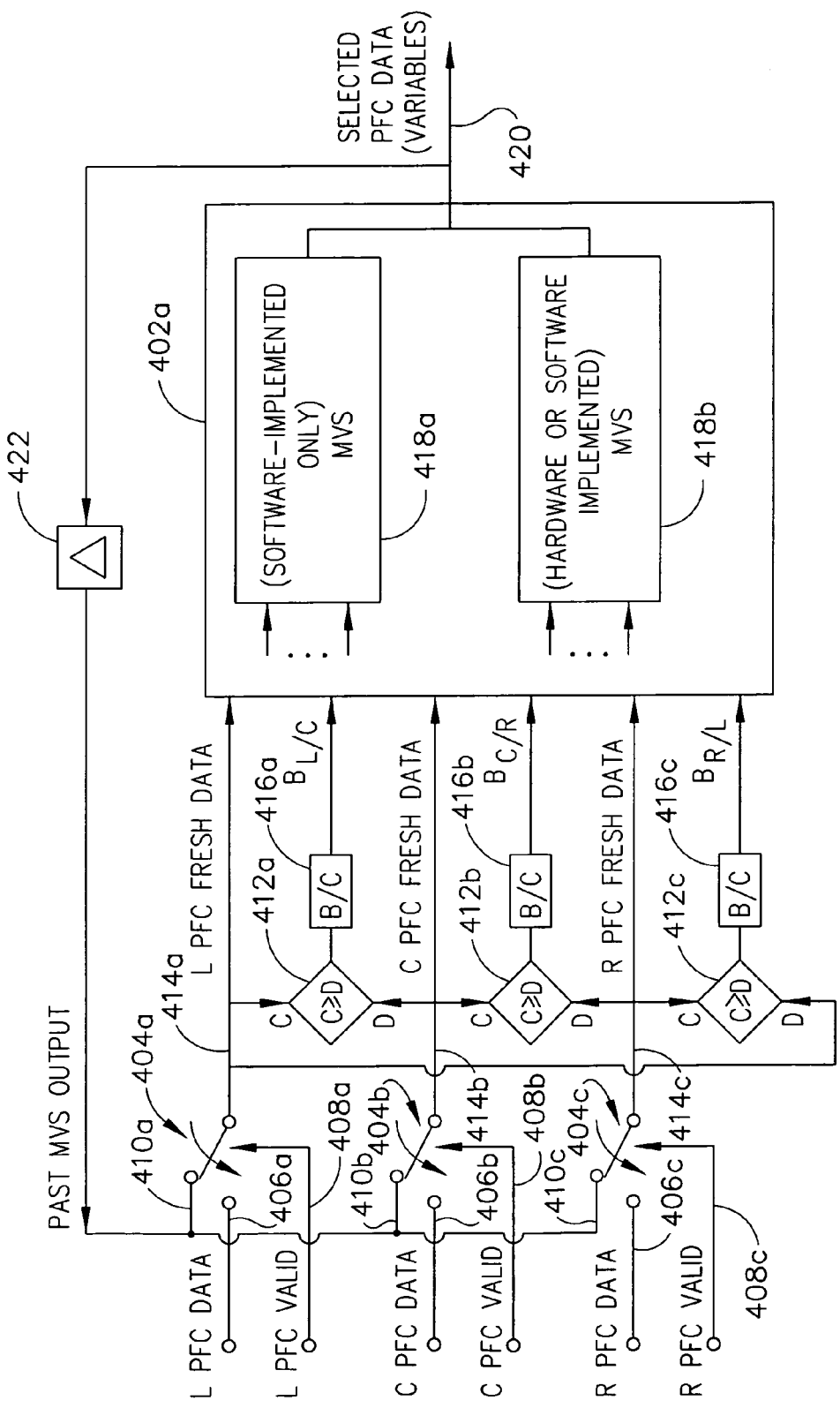
FIG. 4b is a block diagram of the variable data implementation of the mid-value selection element.

FIG. 4a illustrates the MVS function 314 for either variable 402a or discrete 402b applications. In FIG. 4b, three validated PFC "variable" data are compared for the selection of their mid-value. Three switches 404a, 404b and 404c respectively receive L PFC data, C PFC data and R PFC data on inputs 406a, 406b and 406c. A data valid input controls the position of each switch with L PFC Valid received on input 408a, C PFC valid on input 408b and R PFC valid on input 408c. The alternate position of each switch, 410a, 410b and 410c respectively, receives prior MVS output data to be described subsequently, if the data valid signal is not true.

Data passed from the switches is operated on by comparators 412a, 412b and 412c for generation of control signals to be implemented in the MVS function 402a Comparator 412a receives L PFC fresh data 414a output from switch 404a on input C and C PFC fresh data 414b output from switch 404b on input D. The comparison $C \geq D$ is performed and the output held by Boolean to Continuous latch 416a to provide control signal $B_{L/C}$. Comparator 412b receives C PFC fresh data 414b output from switch 404b on input C and R PFC fresh data 414c output from switch 404c on input D. The comparison $C \geq D$ is performed and the output held by Boolean to Continuous latch 416b to provide control signal $B_{C/R}$. Comparator 412c receives R PFC fresh data 414c output from switch 404c on input C and L PFC fresh data 414a output from switch 404a on input D. The comparison $C \geq D$ is performed and the output held by Boolean to Continuous latch 416c to provide control signal $B_{R/L}$.

Figure 4C:
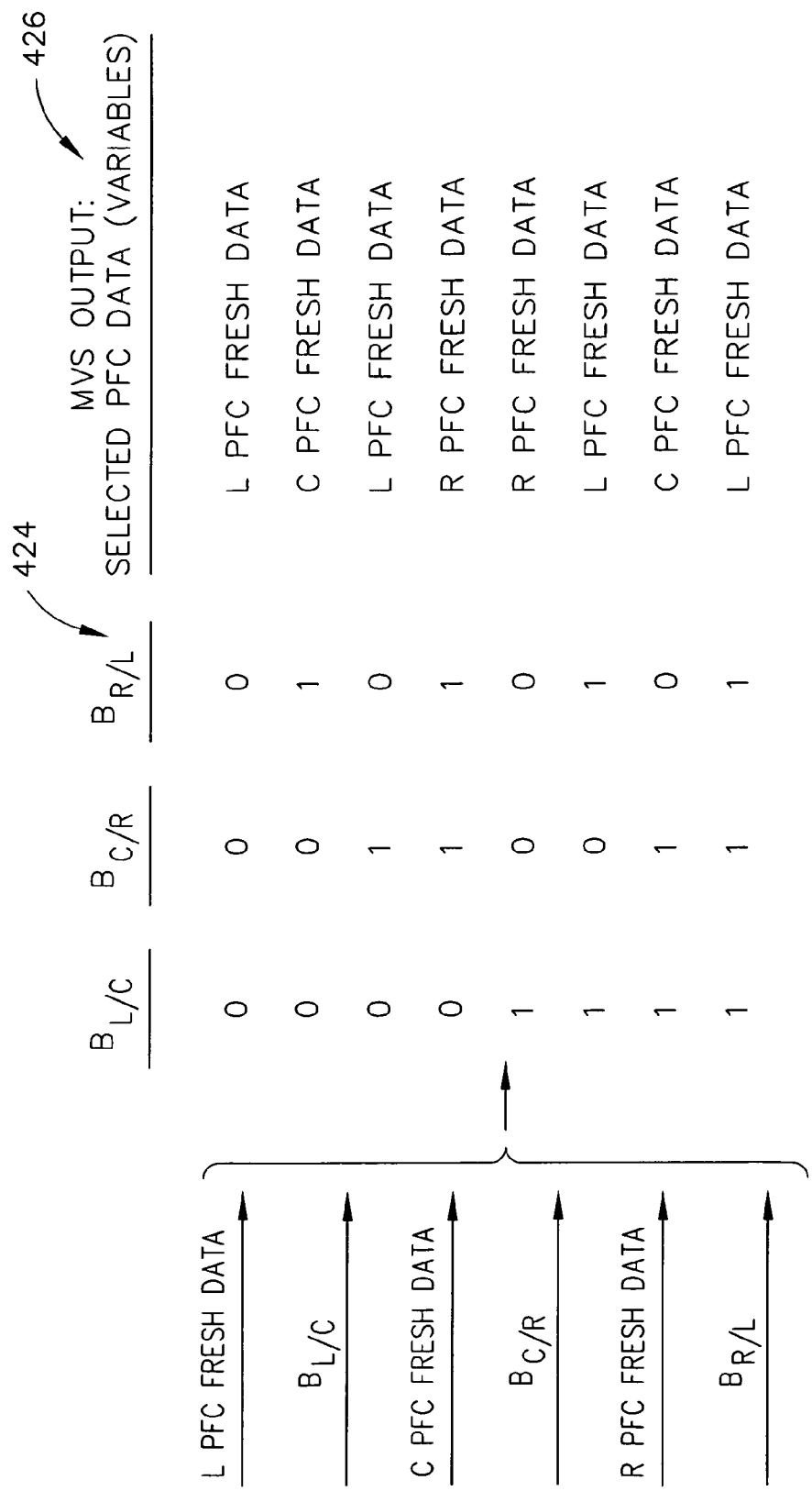
FIG. 4c is a block diagram of a table look-up implementation of the variable mid-value selection of FIG. 4b
Figure 4D:
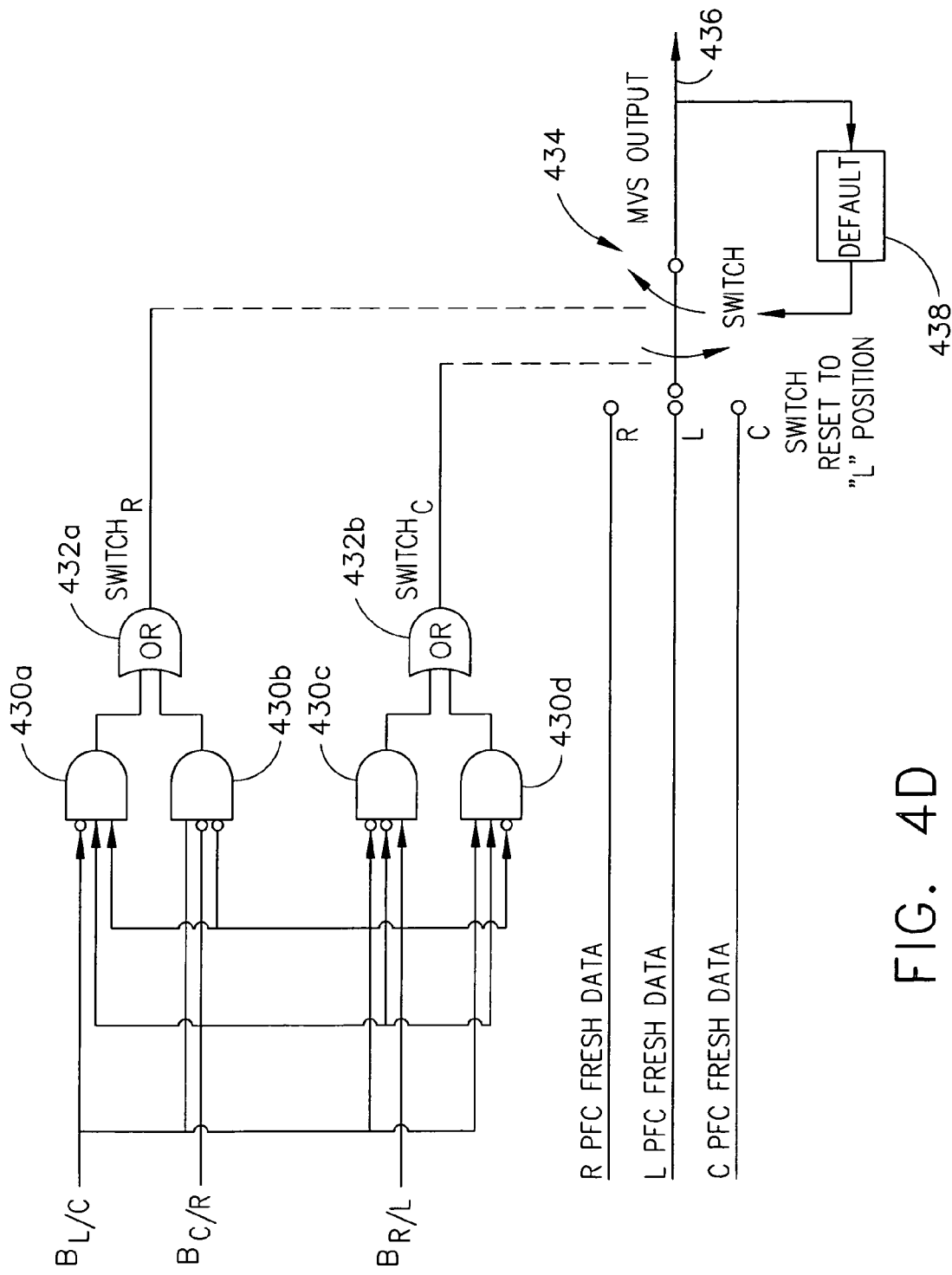
FIG. 4d is a block diagram of a hardware or software implementable variable mi-value selection of FIG. 4b.

The fresh data is provided with the control signals to MVS function 402a which employs in alternative embodiments a table look-up method 418a explained with respect to FIG. 4c which is more suitable for software implementation, or a hardware implementation 418b using logic gates, as explained with respect to FIG. 4d, that is alternatively implemented by hardware or software. The MVS function provides selected PFC data variables on output 420. L/C/R PFC data for which a valid signal has not been supplied to the associated switch is substituted by a past value of MVS output held in nonvolatile memory 422 and applied to the second input of the switches 410a, 410b and 410c as previously described.

Referring to FIG. 4c, lookup table function 424 receiving L PFC Fresh Data, C PFC Fresh Data and R PFC Fresh Data and control signals $B_{L/C}$, $B_{C/R}$ and $B_{R/L}$ as described with respect to FIG. 4b, passes Selected PFC data (variables) 426 as the output. For $B_{L/C}$, $B_{C/R}$ and $B_{R/L}$ equal to 000, L PFC Fresh Data is provided. For $B_{L/C}$, $B_{C/R}$ and $B_{R/L}$ equal to 001, C PFC Fresh data is provided. For $B_{L/C}$, $B_{C/R}$ and $B_{R/L\ equal}$ 010 L PFC Fresh Data is provided. For $B_{L/C}$, $B_{C/R}$ and $B_{R/L}$ equal 011 R PFC Fresh Data is provided. For $B_{L/C}$, $B_{C/R}$ and $B_{R/L}$ equal 100 R PFC Fresh Data is provided. For $B_{L/C}$, $B_{C/R}$ and $B_{R/L}$ equal 101 L PFC Fresh Data is provided. For $B_{L/C}$, $B_{C/R}$ and $B_{R/L}$ equal 110 C PFC Fresh Data is provided. Finally, for $B_{L/C}$, $B_{C/R}$ and $B_{R/L}$ equal 111 L PFC Fresh Data is provided.

Referring to FIG. 4d, control signals $B_{L/C}$, $B_{C/R}$ and $B_{R/L}$ are received by AND gates 430a, 430b, 430c and 430d with gate 430a receiving $B_{L/C}$ NOT, $B_{C/R}$ and $B_{R/L}$, gate 430b receiving $B_{L/C}$, $B_{C/R}$ NOT and $B_{R/L}$ NOT, gate 430c receiving $B_{L/C}$ NOT, $B_{C/R}$ NOT and $B_{R/L}$ and gate 430d receiving $B_{L/C}$, $B_{C/R}$ and $B_{R/L}$ NOT. Outputs from gates 430a and 430b are provided to a first OR gate 432a while outputs from gates 430c and 430d are provided to a second OR gate 432b. A true output on OR gate 432a provides a switch R command to switch 434 resulting in R PFC Fresh data being provided as the MVS output 436. A true output on OR gate 432b provides a switch C command to switch 434 resulting in C PFC Fresh Data being provided to the output while a False output on both OR gates maintains the switch in a position to provide L PFC Fresh Data. An initial condition and default setting for the switch is provided through function 438 which sets the switch by definition to L PFC Fresh Data. A contradiction in outputs, i.e. a true on both OR gates 432a and 432b also results in the default setting.

Figure 4E:
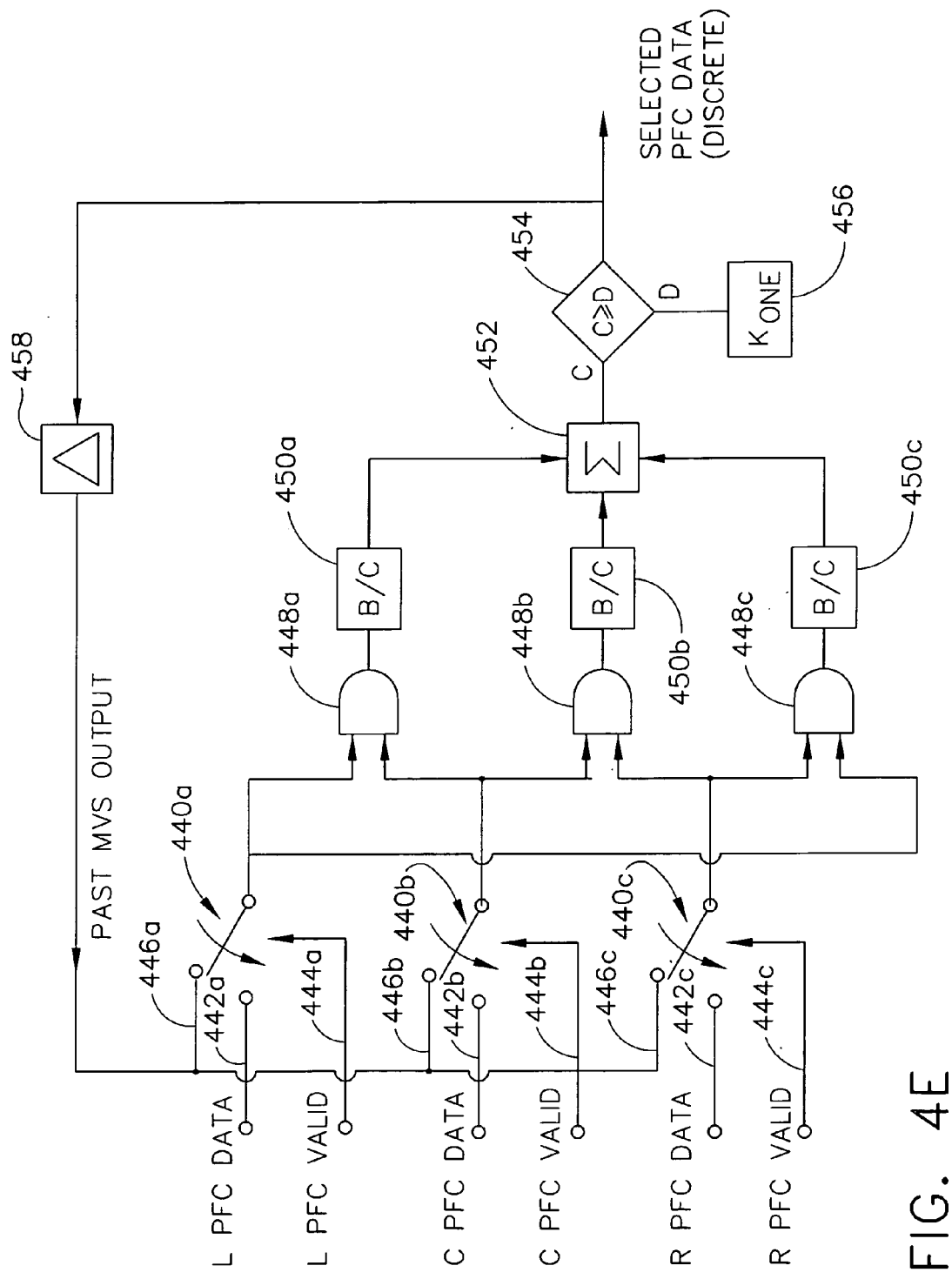

The validated PFC "discrete" data is processed as shown in FIG. 4e. As with MVS on variable data, three switches 440a, 440b and 440c respectively receive L PFC data, C PFC data and R PFC data on inputs 442a, 442b and 442c. A data valid input controls the position of each switch with L PFC Valid received on input 444a, C PFC valid on input 444b and R PFC valid on input 444c. The alternate position of each switch, 446a, 446b and 446c respectively, receives prior MVS output data to be described subsequently, if the data valid signal is not true.

Data passed from the switches is received by AND gates 448a, 448b and 448c with AND 448a receiveing data from switch 440a and 440b, AND 448b receiving data from switch 440b and 440c and AND 448c receiving data from switch 440c and 440a. The outputs of the AND gates is held in Boolean to Continuous latches 450a, 450b and 450c respectively and the outputs of the latches provided to summer 452. The output of summer 452 is operated on at input C by comparator 454 with a constant 456 on input D. For the exemplary embodiment a constant Kone=1 is employed. If C≧D a true output is provided from the comparator. As with the variable implementation, a non-volatile memory 458 retains the past value of the comparator output for feedback to the switches in the event the data valid signal is not true.

Figure 5A:
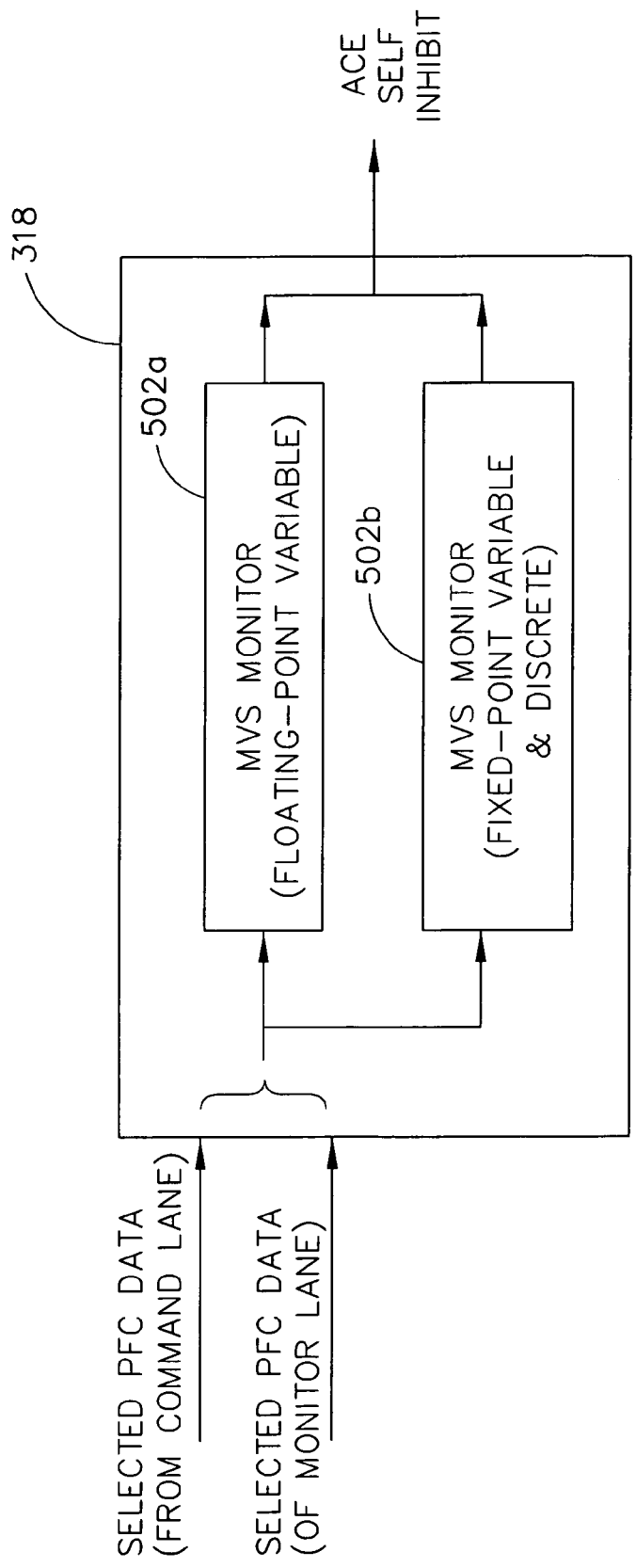
Figure 5B:
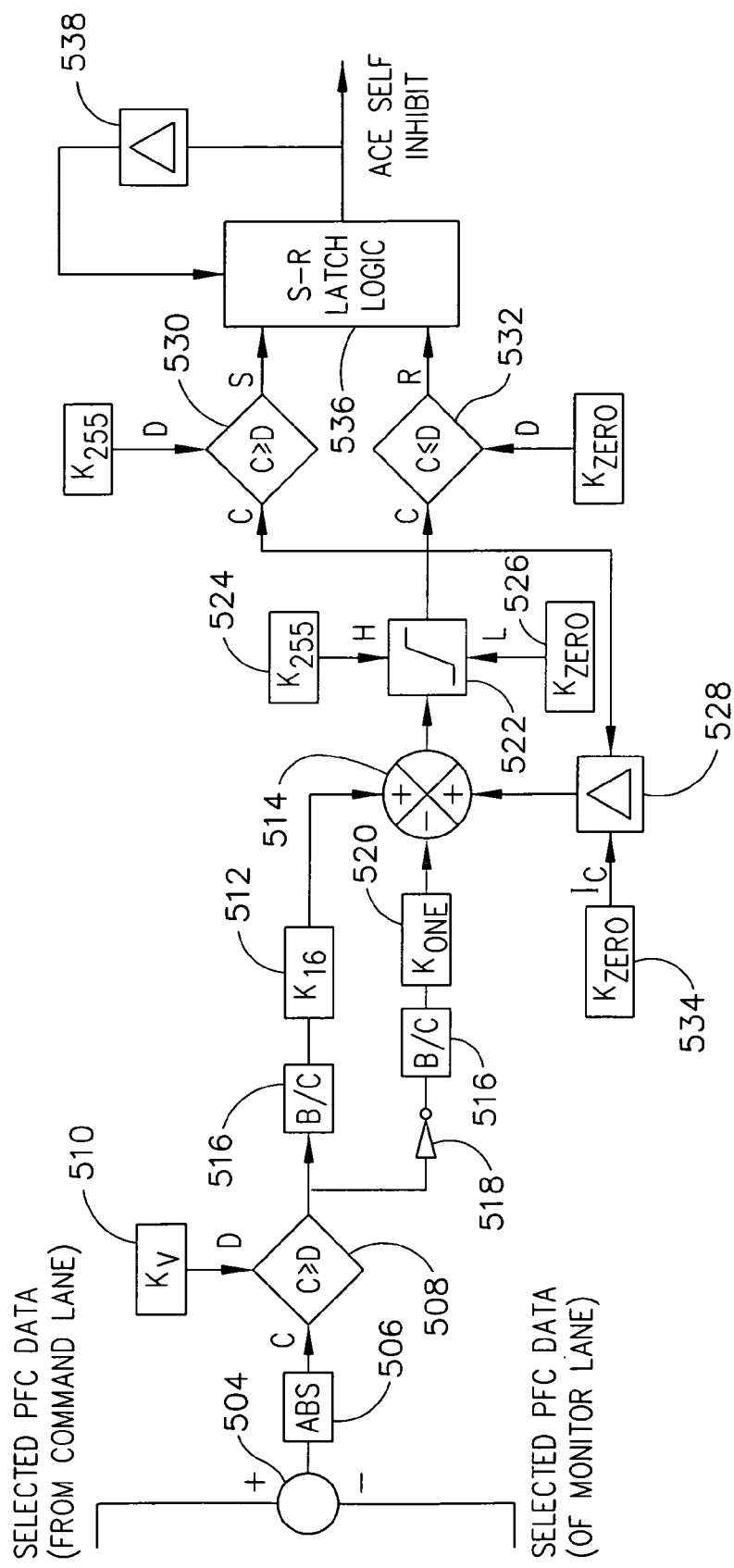
FIG. 5b is a block diagram of the MVS Monitor for floating-point variables.
Figure 5C:
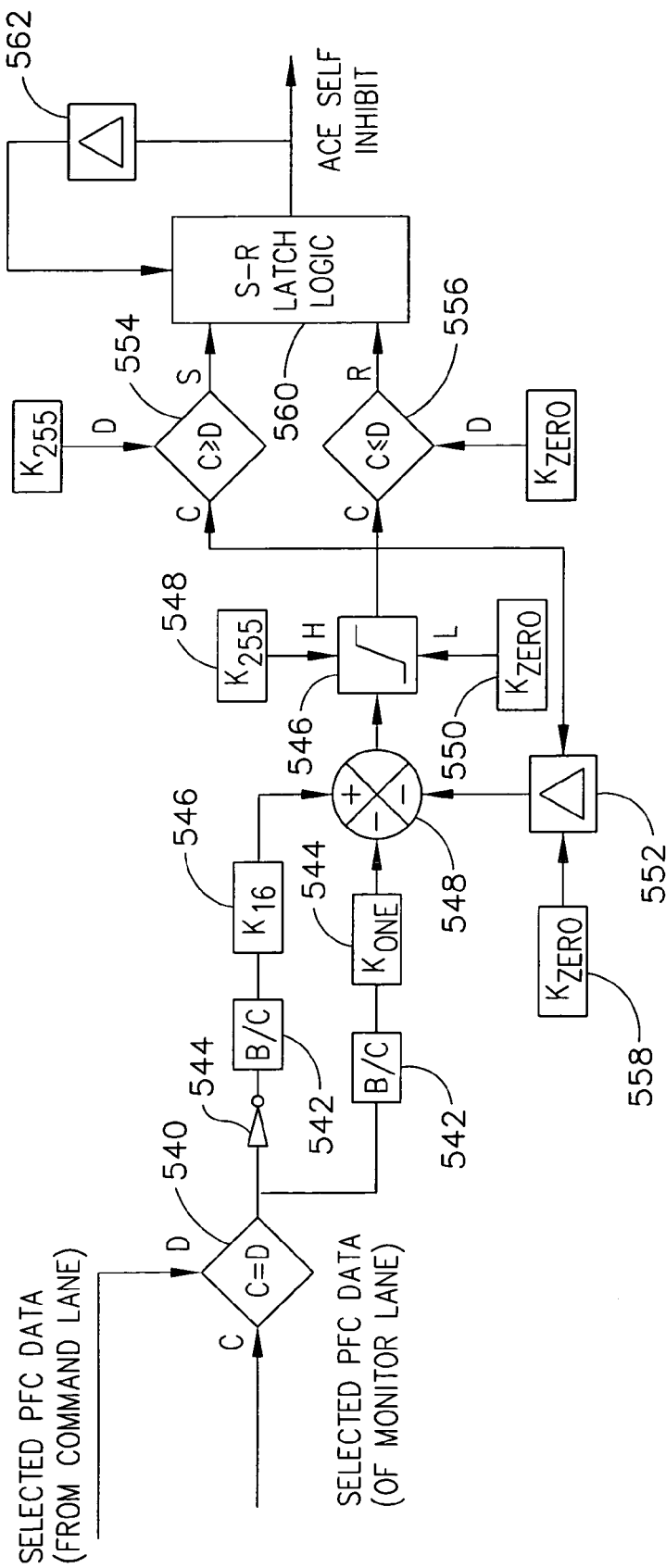
FIG. 5c is a block diagram of the MVS monitor for fixed-point variables or discrete output; and, FIGS. 6a-6n and 6p are descriptions of the symbology employed in the block diagram descriptions of the embodiments herein.

FIG. 5a illustrates the MVS Monitor function 318 acting on Selected PFC Data output by the MVS functions described above from the command lane and monitor lane for monitoring of "floating-point variables" 502a as described with respect to FIG. 5b and "fixedpoint variables or discrete" 502b as described with respect to FIG. 5c. Referring to FIG. 5b, selected PFC data from the command lane and selected PFC data from the monitor lane are input to an adder 504, with one input inverted to provide a difference value. The absolute value of the difference is taken 506 and provided on input C of a comparator 508. When "floating-point" variable arithmetic is used, the monitor threshold needs to include potential "round-off" error which is provided on the D input of comparator 508 using a predetermined constant 510. In the present embodiment, the constant, Kv, is determined based on acceptable tolerance/run-off of floating-point data between the two lanes. If comparator 508 determines that the difference between the command lane data and the monitor lane data exceeds the threshold, Boolean to continuous function 510 provides a "1" multiplier for a constant 512 greater than one which is input as an up-count to up-down counter 514. For the embodiment shown a value of 16 is employed. Boolean to continuous function 516 receives an input from comparator 508 through inverter 518 and provides a multiplier for constant 520, implemented in the embodiment shown with a value of 1, which is input as a down count to up-down counter 514 when comparator 508 provides a "not-true". Output of the up-down counter is provided to a limiter 522 having high and low threshold inputs defined by constants 524 and 526, which for the embodiment shown are 255 and zero. The output of the limiter is provided to non-volatile memory 528 which maintains the present value for input to the up-down counter, a first comparator 530 to determine if the value has reached the upper threshold and a second comparator 532 to determine if the value has returned to the zero threshold. A constant 534, zero for the embodiment shown, is provided as the initial condition for non-volatile memory 528. A S-R logic latch 536 receives the output of comparator 530 on the "Set" input and the output of comparator 532 on the "Reset" input. A non-volatile memory 538 returns the current value to the data input of the S-R latch. The "ACE self inhibit" will be generated for persistent disagreement between MVS outputs via the up-down counter and S-R latch.

The MVS Monitor for fixed point variables or discrete is similar in operation with selected PFC data from the monitor lane provided on input C and selected PFC data from the command lane provided on input D of a comparator 540. A "not true" comparison provides a signal to Boolean to continuous function 542 through inverter 544 which then operates as a multiplier for constant 546 greater than one, which for the embodiment of the drawings is equal to 16. A "true" output from comparator 540 results in a down-count for up-down counter 548. Boolean to continuous function 542 receives an input from comparator 540 and provides a multiplier for constant 544, implemented in the embodiment shown with a value of 1. Output of the up-down counter is provided to a limiter 546 having high and low threshold inputs defined by constants 548 and 550, which for the embodiment shown are 255 and zero. The output of the limiter is provided to non-volatile memory 552 which maintains the present value for input to the up-down counter, a first comparator 554 to determine if the value has reached the upper threshold and a second comparator 556 to determine if the value has returned to the zero threshold. A constant 558, zero for the embodiment shown, is provided as the initial condition for non-volatile memory 552. A S-R logic latch 560 receives the output of comparator 554 on the "Set" input and the output of comparator 556 on the "Reset" input. A non-volatile memory 562 returns the current value to the data input of the S-R latch. The "ACE self inhibit" will be generated for persistent disagreement between MVS outputs via the up-down counter and S-R latch.

Figure 6A:
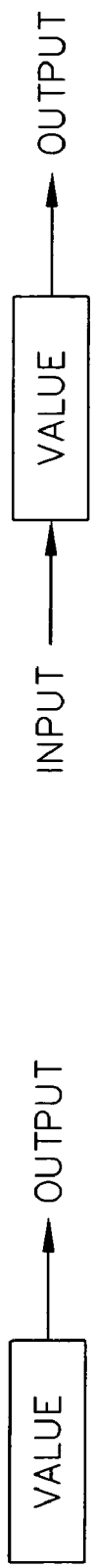
Figure 6B:
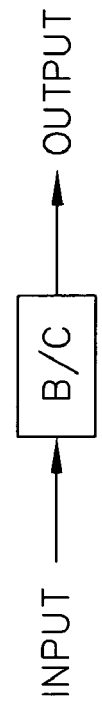
Figure 6C:
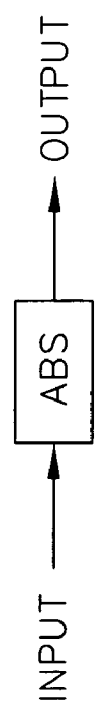
Figure 6D:
Figure 6F:
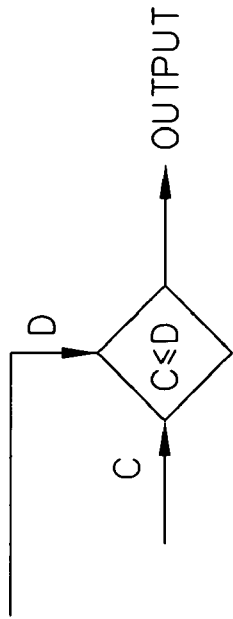
Figure 6G:
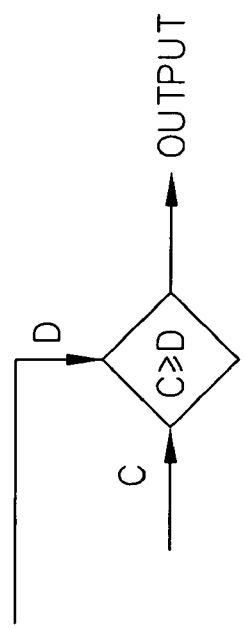
Figure 6E:
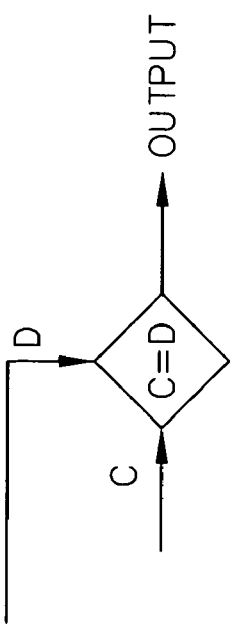
Figure 6H:
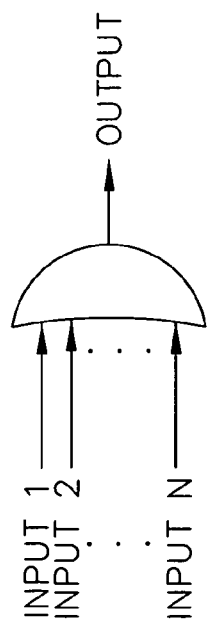
Figure 6I:
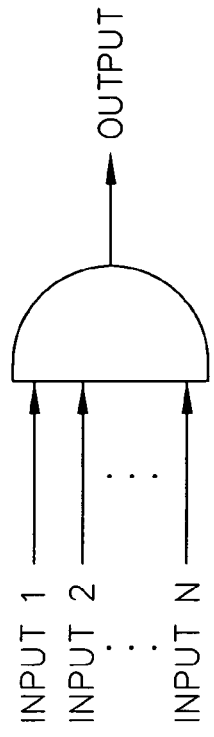
Figure 6J:
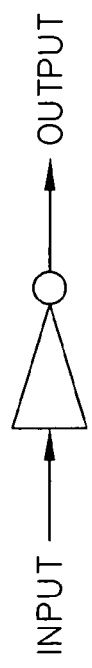
Figure 6K:
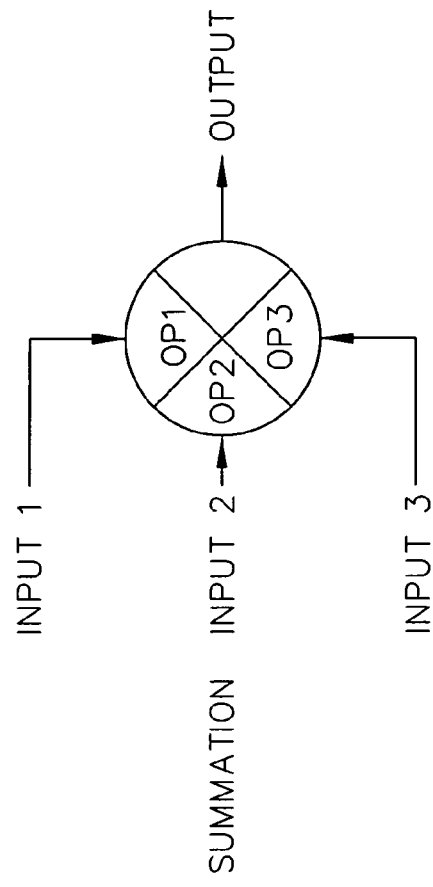
Figure 6L:
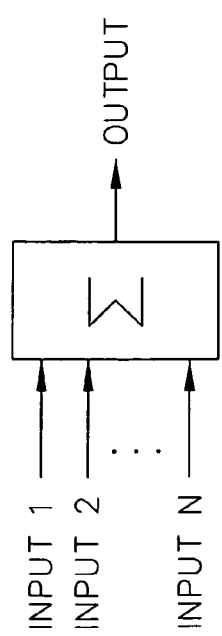
Figure 6M:
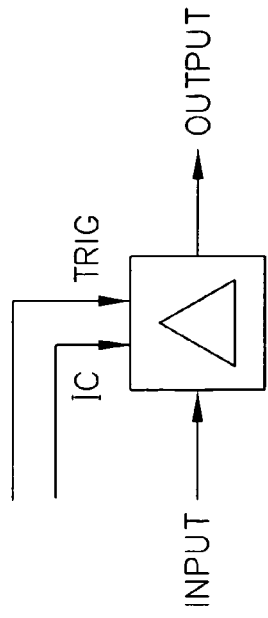
Figure 6N:
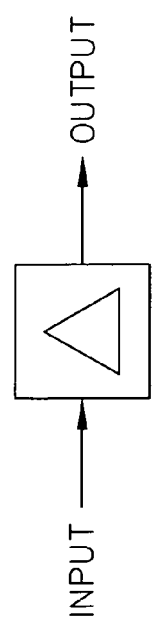
Figure 6P:
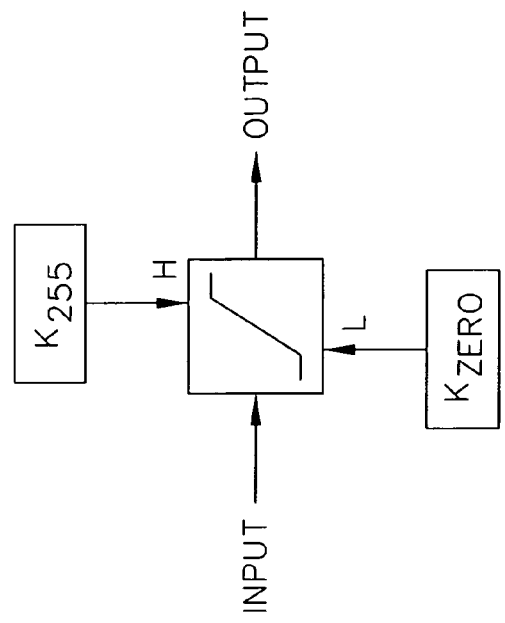

FIGS. 6a through 6n provide definition for the symbology employed in FIGS. 4b, 4d, 4e, 5b and 5c with values as shown in tables 6a through 6p below.

TABLE 6a

| Signal | Type | Constant<br>Description |
|---|---|---|
| VALUE | Fixed Constant | Constant name - should begin with K and include numeric value<br>Examples:<br>$K_{zero} = 0$<br>$K_{one} = 1$<br>$K_{two} = 2$<br>$K_{16} = 16$ |
| OUPUT | Any | Output = VALUE |

TABLE 6b

| Signal | Type | Gain<br>Description |
|---|---|---|
| INPUT | Continuous | |
| VALUE | Fixed Constant | Gain name - should being with a "K" |
| OUTPUT | Continuous | OUTPUT = VALUE * INPUT |

TABLE 6c

| Signal | Type | Description |
|---|---|---|
| INPUT | Continuous | |
| OUTPUT | Continuous | OUTPUT = |INPUT| |

TABLE 6d

| Signal | Type | Description |
|---|---|---|
| INPUT | Boolean | |
| OUPTUT | Continuous | IF (INPUT = TRUE) OUPTPUT = 1<br>ELSE OUTPUT = 0 |

TABLE 6e

| Signal | Type | Description |
|---|---|---|
| C | Any | |
| D | Any | |
| OUTPUT | Boolean | IF(C = D) OUTPUT = TRUE ELSE OUTPUT = FALSE |

TABLE 6f

| Signal | Type | Description |
|---|---|---|
| C | Continuous | |
| D | Continuous | |
| OUTPUT | Boolean | IF(C $\leq$ D) OUTPUT = TRUE ELSE OUTPUt = FALSE |

TABLE 6g

| Signal | Type | Description |
|---|---|---|
| C | Continuous | |
| D | Continuous | |
| OUTPUT | Boolean | IF(C $\geq$ D) OUTPUT = TRUE ELSE OUTPUT = FALSE |

TABLE 6h

| Signal | Type | Description |
|---|---|---|
| INPUT1 | Boolean | |
| INPUT2 | Boolean | |
| . | | |
| . | | |
| INPUT N | Boolean | |
| OUTPUT | Boolean | OUTPUT = (INPUT1)OR(INPUT2) ... OR(INPUTN) |

TABLE 6i

| Signal | Type | Description |
|---|---|---|
| INPUT1 | Boolean | |
| INPUT2 | Boolean | |
| . | | |
| . | | |
| INPUT N | Boolean | |
| OUTPUT | Boolean | OUTPUT = (INPUT1)AND(INPUT2) ... AND(INPUTN) |

TABLE 6j

| Signal | Type | Description |
|---|---|---|
| INPUT | Boolean | |
| OUTPUT | Boolean | OUTPUT = NOT(INPUT) |

TABLE 6k

| Signal | Type | Description |
|---|---|---|
| INPUT1 | Continuous | |
| INPUT2 | Continuous | |
| INPUT3 | Continuous | |

TABLE 6k-continued

| Signal | Type | Description |
|---|---|---|
| OP1 | Symbolic | |
| OP2 | Symbolic | |
| OP3 | Symbolic | |
| POLARITY 1 | Discrete | IF OP1 is "+" POLARITY 1 = +1 ELSE POLARITY 1 = −1 |
| POLARITY2 | Discrete | IF OP2 is "+" POLARITY 2 = +1 ELSE POLARITY 2 = −1 |
| POLARITY3 | Discrete | IF OP3 is "+" POLARITY 3 = +1 ELSE POLARITY 3 = −1 OUTPUT = INPUT1*POLARITY1 + INPUT2*POLARITY2 + INPUT2*POLARITY3 |

TABLE 6l

| Signal | Type | Description |
|---|---|---|
| INPUT1 | Continuous | |
| INPUT2 | Continuous | |
| . | | |
| . | | |
| INPUT N | Continuous | |
| OUTPUT | Continuous | OUTPUT = INPUT1 + INPUT2 + ... + INPUTN |

TABLE 6m

| Signal | Type | Description |
|---|---|---|
| INPUT | Any | |
| IC | Any | Initial Value of OUTPUT |
| TRIG | Boolean | Initialization trigger flag |
| OUTPUT | Any' | During Intialization OUTPUT = IC During Normal Operation OUTPUT = Value of INPUT, taken at the end of the previous process cycle |

TABLE 6n

| Signal | Type | Description |
|---|---|---|
| INPUT | Any | |
| OUTPUT | Any | During Initialization OUTPUT = Post OUTPUT stored in NVM During Normal Operations OUTPUT = Value of INPUT, taken at the end of the previous process cycle. |

TABLE 6p

| Signal | Type | Description |
|---|---|---|
| INPUT | Continuous | |
| H | Constant | |
| L | Constant | |
| OUTPUT | Any | OUTPUT = INPUT if INPUT $\geq$ L and INPUT $\leq$ H ELSE if INPUT < L OUTPUT = L or if INPUT > H OUTPUT = H |

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for providing mid-value selection (MVS) for control command output in a fly by wire system having a plurality of primary flight computers (PFCs) receiving data through integrated flight control buses from actuation control electronics (ACE) for flight crew and status sensor inputs, the PFCs providing data through the flight control buses to the ACE for control signal output, comprising the steps of:
   a. receiving in an ACE data from each PFC;
   b. receiving a data valid signal with respect to each PFC;
   c. selecting, as fresh data for each PFC, data received or past MVS output responsive to the respective data valid signal;
   d. choosing from the PFC fresh data based on a predetermined criterion selected PFC fresh data as the MVS output; and
   e. storing the MVS output for use as past MVS output.

2. A method as defined in claim 1 wherein the step of choosing from the PFC fresh data comprises the steps of:
   a. comparing each set of PFC fresh data with a second set of PFC fresh data;
   b. creating a control signal for each compared pair based on the result of the comparison; and,
   c. choosing the fresh data for the MVS output based on the created control signals.

3. A method as defined in claim 2 wherein the step of choosing comprises conducting a table look-up in a matrix of the control signals.

4. A method as defined in claim 2 wherein the step of choosing comprises logically comparing the control signals and selecting fresh data from a respective PFC based on the result of the comparison.

5. A method as defined in claim 4 wherein the system incorporates three PFCs and three control signals are generated, the comparison comprising:
   providing a first logical AND of the inverse of a first of the control signals with a second and third control signal;
   providing a second logical AND of the first control signal with the inverse of the second and the inverse of the third control signals;
   providing a third logical AND of the inverse of the first and the inverse of the second control signals and the third control signal;
   providing a forth logical AND of the first and second control signals and an inverse of the third control signal;
   logically ORing outputs of the first and second logical ANDs with a resulting "true" selecting fresh data corresponding to a first of the PFCs;
   logically ORing outputs of the third and forth logical ANDs with a resulting "true" selecting fresh data corresponding to a second of the PFCs; and
   selecting fresh data corresponding to the third PFC responsive to "false" results on both logical ORs.

6. A method as defined in claim 2 wherein the system incorporates three PFCs and the step of comparing fresh data comprises the steps of:
   determining in a first comparison if the fresh data from the first PFC is greater than or equal to the fresh data from the second PFC;
   determining in a second comparison if the fresh data from the second PFC is greater than or equal to the fresh data from the third PFC;
   determining in a third comparison if the fresh data from the third PFC is greater than or equal to the fresh data from the second PFC; and
   wherein the step of creating a control signal for each compared pair comprises:
   defining a first control signal as "1" if the first comparison is true and "0" if not;
   defining a second control signal as "1" if the second comparison is true and "0" if not; and
   defining a third control signal as "1 if the third comparison is true and "0" if not.

7. A method as defined in claim 6 wherein the step of choosing the fresh data for the MVS output comprises a table look up wherein
   for the first control signal, the second control signal and third control signal equal to 000, fresh data from the first PFC is provided;
   for the first control signal, the second control signal and the third control signal equal to 001, fresh data from the second PFC is provided;
   for the first control signal, the second control signal and the third control signal equal to 010 fresh data from the first PFC is provided;
   for the first control signal, the second control signal and the third control signal equal to 011 fresh data from the third PFC is provided;
   for the first control signal, the second control signal and the third control signal equal to 100 fresh data from the third PFC is provided;
   for the first control signal, the second control signal and the third control signal equal to 101 fresh data from the first PFC is provided;
   for the first control signal, the second control signal and the third control signal equal to 110 fresh data from the second PFC is provided; and,
   for the first control signal, the second control signal and the third control signal equal to 111 fresh data from the first PFC is provided.

8. A method as defined in claim 1 wherein the system incorporates three PFCs, the PFC data is discrete and the step of choosing from the PFC fresh data comprises:
   conducting a first logical AND of the first and second fresh data;
   conducting a second logical AND of the second and third fresh data;
   conducting a third logical AND of the third and first fresh data;
   summing the output of the three logical ANDs;
   comparing the sum to a constant and choosing the larger value as the MVS output.

9. A mid-value selection (MVS) system for control command output in a fly by wire (FBW) system having a plurality of primary flight computers (PFCs) receiving data through integrated flight control buses from actuation control electronics (ACE) for flight crew and status sensor inputs, the PFCs providing data through the flight control buses to the ACE for control signal output, comprising:
   a. means for receiving in an ACE data from each PFC;
   b. means for receiving a data valid signal with respect to each PFC;
   c. means for selecting, as fresh data for each PFC, data received or past MVS output responsive to the respective data valid signal;
   d. means for choosing from the PFC fresh data based on a predetermined criterion selected PFC fresh data as the MVS output; and e. means for storing the MVS output for use as past MVS output.

10. A system as defined in claim 9 wherein the means for choosing from the PFC fresh data comprises:
   a. means for comparing each set of PFC fresh data with a second set of PFC fresh data;
   b. means for creating a control signal for each compared pair based on the result of the comparison; and,
   c. means for choosing the fresh data for the MVS output based on the created control signals.

11. A system as defined in claim 10 wherein the means for choosing comprises a look-up table having a matrix of the control signals.

12. A system as defined in claim 10 wherein the means for choosing comprises means for logically comparing the control signals and means for selecting fresh data from a respective PFC based on the result of the comparison.

13. A system as defined in claim 12 wherein the FBW system incorporates three PFCs and three control signals are generated, the means for logically comparing comprises:
   a first logical AND of the inverse of a first of the control signals with a second and third control signal;
   a second logical AND of the first control signal with the inverse of the second and the inverse of the third control signals;
   a third logical AND of the inverse of the first and the inverse of the second control signals and the third control signal;
   a forth logical AND of the first and second control signals and an inverse of the third control signal;
   a logical OR receiving the outputs of the first and second logical ANDs with a resulting "true" selecting fresh data corresponding to a first of the PFCs;
   a logical OR receiving the outputs of the third and forth logical ANDs with a resulting "true" selecting fresh data corresponding to a second of the PFCs; and
   means for selecting fresh data corresponding to the third PFC responsive to "false" results on both logical ORs.

14. A system as defined in claim 10 wherein the FBW system incorporates three PFCs and the means for comparing fresh data comprises:
   a first comparator to determine if the fresh data from the first PFC is greater than or equal to the fresh data from the second PFC;
   a second comparator to determine if the fresh data from the second PFC is greater than or equal to the fresh data from the third PFC;
   a third comparator to determine if the fresh data from the third PFC is greater than or equal to the fresh data from the second PFC; and
   wherein the means for creating a control signal for each compared pair comprises:
   a first control signal of "1" output from the first comparator if true and "0" if not;
   a second control signal of "1" output from the second comparator if true and "0" if not; and
   a third control signal of "1" output from the third comparator if true and "0" if not.

15. A system as defined in claim 14 wherein the means for choosing the fresh data for the MVS output comprises a table look up wherein
   for the first control signal, the second control signal and third control signal equal to 000, fresh data from the first PFC is provided;
   for the first control signal, the second control signal and the third control signal equal to 001, fresh data from the second PFC is provided;
   for the first control signal, the second control signal and the third control signal equal to 010 fresh data from the first PFC is provided;
   for the first control signal, the second control signal and the third control signal equal to 011 fresh data from the third PFC is provided;
   for the first control signal, the second control signal and the third control signal equal to 100 fresh data from the third PFC is provided;
   for the first control signal, the second control signal and the third control signal equal to 101 fresh data from the first PFC is provided;
   for the first control signal, the second control signal and the third control signal equal to 110 fresh data from the second PFC is provided; and,
   for the first control signal, the second control signal and the third control signal equal to 111 fresh data from the first PFC is provided.

16. A system as defined in claim 9 wherein the FBW system incorporates three PFCs, the PFC data is discrete and the means for choosing from the PFC fresh data comprises:
   a first logical AND of the first and second fresh data;
   a second logical AND of the second and third fresh data;
   a third logical AND of the third and first fresh data;
   a summer receiving the output of the three logical ANDs;
   means for comparing the sum to a constant and means for choosing the larger value as the MVS output.

* * * * *